Patented May 5, 1931

1,804,226

UNITED STATES PATENT OFFICE

JULIUS A. NIEUWLAND, OF NOTRE DAME, INDIANA, ASSIGNOR TO CANADIAN ELECTRO PRODUCTS COMPANY, LIMITED, OF MONTREAL, CANADA

VULCANIZATION ACCELERATOR AND MANUFACTURE THEREOF

No Drawing. Application filed January 10, 1927. Serial No. 160,309.

This invention relates to a process of making an acetylene-amine product useful as or in the production of an accelerator for the vulcanizing of rubber, and more particularly an acetylene-aniline product.

According to the present invention acetylene and an amine are reacted together in presence of an effective catalyst.

The acetylene-amine reaction is obtained by passing acetylene into an amine, preferably anhydrous, in presence of cuprous chloride or other suitable catalyst. The reaction will commence spontaneously but may be expedited by heating, the temperature being preferably maintained between 60° and 120° C. but the reaction will proceed at temperatures above and below this range. A temperature which has been found satisfactory for an aromatic amine, such as aniline, is about 90° C. Under these conditions, approximately one molecule of acetylene combines with one molecule of the amine. The reaction may be conducted at atmospheric pressure or higher pressure.

The reaction product may now be distilled for removal of uncombined amine and, if desired, fractioned for separation of various components of the product. The fractions collecting between 200° and 275° C. have been found especially useful in the case of acetylene-aniline reaction products.

The following examples are illustrative of various methods of practising the invention, but it will be understood that the invention is not confined to the amines or details thereof which are explanatory and given without limitative intent.

Example I

One hundred parts of aniline is placed in a suitable vessel with approximately two parts of anhydrous cuprous chloride and heated to approximately 90° C. Acetylene is passed into the liquid and the reaction is heated as may be necessary to maintain an efficient rate of reaction. The acetylene supply is continued until the reaction substantially ceases. The product is distilled for removal of uncombined aniline.

Example II

The acetylene-aniline product obtained as in Example I (after distilling off uncombined aniline) is fractionally distilled and the fractions collecting between 200° and 275° C. are separately collected. The fractions collecting between 200° and 240° C. are secondary bases such as ethyl aniline and butyl aniline, while the fractions collecting between 240° and 275° C. are mostly quinaldine or its derivatives.

Other aromatic amines, such as toluidine or naphthylamine, may be treated in the manner of Examples I and II.

Upon distilling the reaction product, as in Example II, there remains a substantially solid non-volatile residue being approximately 30% of the whole amount of product. The nature of this residue has not been exactly determined but is thought to be polymerized vinyl aniline. The amount of the non-volatile material may be varied by modifying the conditions of the reaction.

The reaction may be carried out using any aromatic amine and, so far as can now be ascertained, any aliphatic amine, the temperatures, pressures and duration of treatment being subject to variation according to the amine dealt with. Any effective catalyst other than cuprous chloride may be used.

Having thus described my invention, what I claim is:—

1. A process which comprises reacting together acetylene and an amine in presence of cuprous chloride as catalyst.

2. A process which comprises reacting together acetylene and an aromatic amine in presence of cuprous chloride as catalyst.

3. A process which comprises reacting together acetylene and aniline in presence of a catalyst at a temperature between 60° and 120° C.

4. A process which comprises reacting together acetylene and aniline in presence of cuprous chloride as catalyst.

5. A process which comprises reacting together acetylene and aniline in presence of anhydrous cuprous chloride as catalyst.

6. A process which comprises reacting together acetylene and aniline in presence of cuprous chloride as catalyst while maintaining a temperature between 60° and 120° C.

7. A process of making an accelerator for the vulcanization of rubber which comprises passing acetylene into an amine at a temperature between 60° and 120° C. in presence of cuprous chloride as catalyst and distilling off uncombined amine.

8. A process of making an accelerator for the vulcanization of rubber which comprises passing acetylene into aniline at a temperature between 60° and 120° C. in presence of cuprous chloride as catalyst, distilling off uncombined aniline and fractionally distilling the resulting product with separate collections of fractions between 200° and 275° C.

In witness whereof, I have hereunto set my hand.

JULIUS A. NIEUWLAND.